US005520773A

United States Patent [19]

Hollis et al.

[11] Patent Number: 5,520,773

[45] Date of Patent: May 28, 1996

[54] LABEL APPLICATOR

[75] Inventors: Jeffrey C. Hollis; Chad Bones, both of Modesto; Troy M. York, Manteca; Thomas S. Trebotich, Fremont; Eric Scott, Modesto, all of Calif.

[73] Assignee: Tab Products Company, Palo Alto, Calif.

[21] Appl. No.: 116,720

[22] Filed: Sep. 3, 1993

[51] Int. Cl.[6] ........ B32B 31/00

[52] U.S. Cl. ........ 156/486; 156/541; 156/542; 156/490

[58] Field of Search ........ 156/486, 490, 156/491, 540, 541, 542

[56] References Cited

U.S. PATENT DOCUMENTS

| | | | |
|---|---|---|---|
| 1,732,908 | 10/1929 | Murphy | 156/486 X |
| 2,064,658 | 12/1936 | Grieb et al. | 156/486 |
| 2,210,433 | 8/1940 | Roscoe | 156/486 X |
| 2,267,195 | 12/1941 | Elliott | 156/486 X |
| 3,954,550 | 5/1976 | Patterson | 156/486 |
| 4,183,779 | 1/1980 | Barber et al. | 156/361 |
| 4,288,272 | 9/1981 | Pfeffer | 156/361 |
| 4,294,644 | 10/1981 | Anderson | 156/361 |
| 4,566,933 | 1/1986 | Crankshaw et al. | 156/542 X |
| 5,084,127 | 1/1992 | Nakamura | 156/542 X |
| 5,209,374 | 5/1993 | Seidl-Lichthardt | 221/73 |
| 5,232,540 | 8/1993 | Southwell et al. | 156/361 |

*Primary Examiner*—James Engel
*Assistant Examiner*—Paul M. Rivard
*Attorney, Agent, or Firm*—Donald Cayen

[57] ABSTRACT

A label applicator applies adhesive labels to opposite surfaces of a piece of stock. The labels are affixed to a backing sheet having turning strips on a leading edge thereof. The backing sheet is advanced along a label tray in a manner that peels a first portion of a label from the backing sheet and feeds the peeled portion to a transfer point. A piece of stock is placed on a stock tray such that the area to which the label is to be applied is under the transfer point. The stock tray is tilted to bring the first surface of the piece of stock into contact with the first portion of the label at the transfer point. Continued tilting of the stock tray causes the label to be squeezed between the stock and a plate and to peel a second portion from the backing sheet. The plate is linked to a wrapping roller by bars and levers. Further tilting of the stock tray against the plate forces the wrapping roller, through pivoting and sliding motions of the bars and levers, to travel along a path that contacts the second portion of the label and wraps it around the piece of stock and applies it to the second surface thereof.

25 Claims, 13 Drawing Sheets

LABEL APPLICATOR

BACKGROUND OF THE INVENTION

1. Field of the Invention

This invention pertains to filing systems, and more particularly to apparatus that facilitates storing and retrieving documents.

2. Description of the Prior Art

Various types of products and equipment have been developed to file documents and other items. A very common document filing system is composed of manila folders in conjunction with filing cabinets. Related documents are placed in a file folder, and numerous folders are stored in a filing cabinet. The file folders are usually marked in some way, such as with labels, to enable persons to quickly identify the types of documents inside them.

In many document filing systems, the file folders are furnished with labels that are located along an edge of one of the folder flaps adjacent the fold between the two flaps. Such folders are called side labeled folders. When side labeled folders are stored in a filing cabinet, the labels are vertically oriented. The labels are readily visible, with the labeled ends of the folders being adjacent each other along a horizontal row of folders. Since the folder labels are continuously exposed to view when stored in a filing cabinet, it is important that they present a uniform appearance. Both the appearance of the labels themselves and the positioning of the labels on the folders must be carefully controlled in order to produce an attractive filing system.

For efficient use of filing systems using file folders, it is vital that the labels bear complete and accurate information regarding the documents in the file folder. Accordingly, alphabetic, numeric, bar code, name, date, or other identifying indicia are imprinted on the labels in any combination that suits the user's needs. Labels for side labeled folders may be printed with duplicate information arranged side-by-side. Such labels are wrapped around an edge of a folder flap. The label information is thus viewable from both sides of the folder. U.S. Pat. No. 5,083,816 shows one type of label suitable for side labeled folders.

The generation of file folder labels can be achieved by various means, such as by a printing system at a central location. U.S. Pat. No. 4,939,674 describes a label generation apparatus that can produce different labels on a high volume basis. The labels are neatly applied to the file folders at a later operation, usually by automated machinery at the label generation site. The completed folders are then shipped to the end user.

Labels may also be generated on a relatively low volume basis by the end user using on-site computer controlled printer equipment. The computer and printer are programmed to generate the requisite labels as needed. In that manner, delays in information entry into a filing system while waiting for factory generated labels are eliminated. Tab Products Company of Palo Alto, Calif., provides software for on-site label generation under the trademark Tabquick.

Although on-site label generation possesses the advantages of flexibility and quick availability, it also presents the problem of properly applying the labels to the file folders. The labels must be properly aligned with the edges of the folder flaps in order to provide a neat appearance both to the individual folders and in relation to the other folders in a filing cabinet.

However, it is a tedious task to manually apply labels to file folders. Each label must be carefully aligned with the folder flap edge and applied without subsequent misalignment. The task of manually applying the labels is even more difficult if the labels carry duplicate information. In that case, each label must be wrapped around a flap edge and pressed against opposite sides of the flap. With duplicate labels, any misalignment is doubled. A file folder with a misapplied label is usually ruined.

Thus, a need exists for improvements in the way labels are applied to file folders.

SUMMARY OF THE INVENTION

In accordance with the present invention, a label applicator is provided that greatly facilitates the task of applying labels to thin pieces of stock. This is accomplished by apparatus that includes a label feed mechanism and a stock feed mechanism that cooperate to apply a portion of a label to one side of the stock, and a wrapping mechanism that applies the rest of the label to the opposite side of the stock.

The labels are handled by means of a label sheet, which in turn is comprised of a flexible but strong backing sheet. The backing sheet has a leading edge and a trailing edge. A series of narrow turning strips are arranged side by side proximate and parallel to the backing sheet leading edge.

The labels are made of a paper or other flexible material that is preferably stiffer than the backing sheet. The labels are located between the turning strips and the backing sheet trailing edge. The labels are affixed rather weakly to the backing sheet by a pressure sensitive adhesive.

The label applicator includes a frame having a floor, two side walls, and a beam extending between the side walls. The frame defines a generally vertical central plane that extends between the side walls. The label feed mechanism is located on one side of the central plane. The label feed mechanism feeds labels one at a time to a transfer point located generally within the central plane. For that purpose, the label feed mechanism comprises a reciprocating shovel, a label tray, and a pair of rollers. The shovel is vertically reciprocable generally along the central plane. The label tray extends between and is secured to the frame side walls. The label tray has a working edge that is parallel and close to the central plane. The shovel is reciprocated between a first location whereat a concave surface on the shovel is adjacent the label tray working edge, and a second location whereat the shovel concave surface is remote from the label tray working edge. One of the rollers extends between and is fixed to the frame side walls. The fixed roller is located under the label tray working edge. The second roller is located generally under the fixed roller. The second roller is selectively moveable into and out of rolling contact with the fixed roller.

The label feed mechanism operates as follows. The shovel is translated to its first location. The second roller is moved to be separated from the fixed roller. A label sheet is placed on the label tray and under a drag plate, with the turning strips being within a slit proximate the label tray working edge. The label sheet is pushed manually through the slit and toward the shovel until the leading edge contacts the shovel concave surface. The label sheet is pushed further against the shovel, which bends the backing sheet leading edge under the label tray, until the backing sheet leading edge is lower than the lowermost point of the fixed roller. The drag plate prevents the label sheet from sliding down the label tray by gravity. Then the second roller is moved into contact with the fixed roller to form a nip with the label sheet turning strips caught in the nip. The shovel is then translated away from the label tray working edge.

The fixed roller rotates to advance the label sheet along the label tray and to bend the backing sheet over the label tray working edge. The drag plate provides a slight uniform resistance to the advancement of the label sheet. As the first label behind the turning strips approaches the label tray working edge, it does not bend around the label tray working edge with the backing sheet. Rather, because of the relatively great stiffness of the label material and the rather weak bond between the label and the backing sheet, the label leading portion peels from the backing sheet and remains generally planar with the label tray. The slit at the label tray working edge assists to maintain the label planar with the plane of the label tray as the backing sheet bends under the label tray working edge. The fixed roller rotates an amount such that approximately three-fourths of the label becomes peeled and unsupported in space, with the trailing portion of the label still affixed to the backing sheet. At that point, the label leading portion is at the transfer point.

The stock feed mechanism is located on the opposite side of the label applicator central plane as the label feed mechanism. The stock feed mechanism includes a stock tray that has a first edge located parallel to and near the central plane. The stock tray first edge may have a cutout of a size slightly larger than the area of one-half of a label. Two locating edges on the stock abut respective stops to properly place the stock on the stock tray. When the stock is in its proper placement on the stock tray, the area of the stock to which a label is to be applied overhangs the stock tray first edge, and the stock area to which the label is to be applied is directly under the leading portion of the label at the transfer point. The stock tray is hinged to the label applicator frame. Mounted to the frame under and bearing against the stock tray is a cam. Operating the cam causes the stock tray to oscillate about its hinge between raised and lowered positions and to raise and lower the stock tray first edge accordingly.

The wrapping mechanism is comprised of two arms, each pivoted at one end to an associated frame side wall. A plate extends between and is rigidly joined to the arms near their second ends. The plate overlies the stock tray first edge. The underside of the plate is provided with a soft pad. To the second end of each arm is pivotally connected one end of a bar. Each bar has a slot therethrough. A pin extends through each slot to pivotally and slidingly attach the respective bar to the frame. The second end of each bar pivotally supports one end of a lever. A first spring holds the lever against a stop on the associated bar. Extending between the second ends of the lever is a wrapping roller. The wrapping mechanism is biased to a normal condition by second springs acting between the frame and the arms. In the normal condition, the plate and the wrapping roller lie on opposite sides of the central plane, and the wrapping roller is generally vertically above the label tray working edge.

In operation, the cam of the stock feed mechanism operates to tilt the stock tray to a raised position. That action causes the area of the stock that overhangs the stock tray first edge to raise to the transfer point such that the stock upper surface contacts the peeled portion of the label. A slight further tilting of the stock tray causes the stock to press the label against the pad on the wrapping mechanism plate, thereby firmly applying the label peeled portion to the stock upper surface. Continued operation of the cam causes further raising of the stock tray first edge, with the peeled portion of the label squeezed between the stock and the wrapping mechanism plate. As a result, the stock tray forces the wrapping mechanism plate to pivot the arms, bars, and levers against the force of the second springs toward an operating condition. Simultaneously, the trailing portion of the label is peeled from the backing sheet, with that newly peeled label portion overhanging the stock. The wrapping mechanism arms pivot about and slide over the pins attaching them to the frame side walls in a manner that causes the wrapping roller to travel along a path that contacts the newly peeled trailing portion of the label from the top side thereof. As the wrapping roller continues to travel, it wraps the label trailing portion under the stock. At the point of maximum stock tray tilt, i.e., when the stock tray first edge is at its highest point, the wrapping roller firmly presses the label trailing portion against the stock bottom surface. The pivotal connection and the first springs between the wrapping mechanism bars and levers enable the wrapping roller to conform to the location of the stock tray first edge and the associated stock overhanging area.

From that point, further cam operation allows the stock tray to tilt back toward its lowered position, and the second springs return the wrapping mechanism to its normal condition. When the stock tray is at its lowermost position, the stock is removed therefrom, with the label neatly and properly applied to both stock surfaces. Removal of the stock signals the fixed roller of the label feed mechanism to advance the label sheet and present a new partially peeled label to the transfer point. A new piece of stock is placed on the stock tray against the stop, and the cycle is repeated for as many labels as are on the label sheet. The shovel remains at its second location remote from the label tray working edge.

When all the labels are used from the label sheet, the trailing edge of the backing sheet is in the nip between the two label feed mechanism rollers. The second roller is moved to release the backing sheet. The shovel is translated to its first location. A new label sheet is placed on the label tray, and the label applicator is readied for use as described previously.

The method and apparatus of the present invention, using a flexible label sheet with relatively stiff labels weakly affixed thereto, thus applies the labels to pieces of stock in a neat and efficient fashion. Separate pieces of stock and individual labels are repeatably fed to a transfer point, where the labels are applied to the stock, until all the labels are used from the label sheet. A new label sheet is easily loaded into the label applicator for continued application to the pieces of stock.

Other advantages, benefits, and features of the present invention will become apparent to those skilled in the art upon reading the detailed description of the invention.

Figure 7:
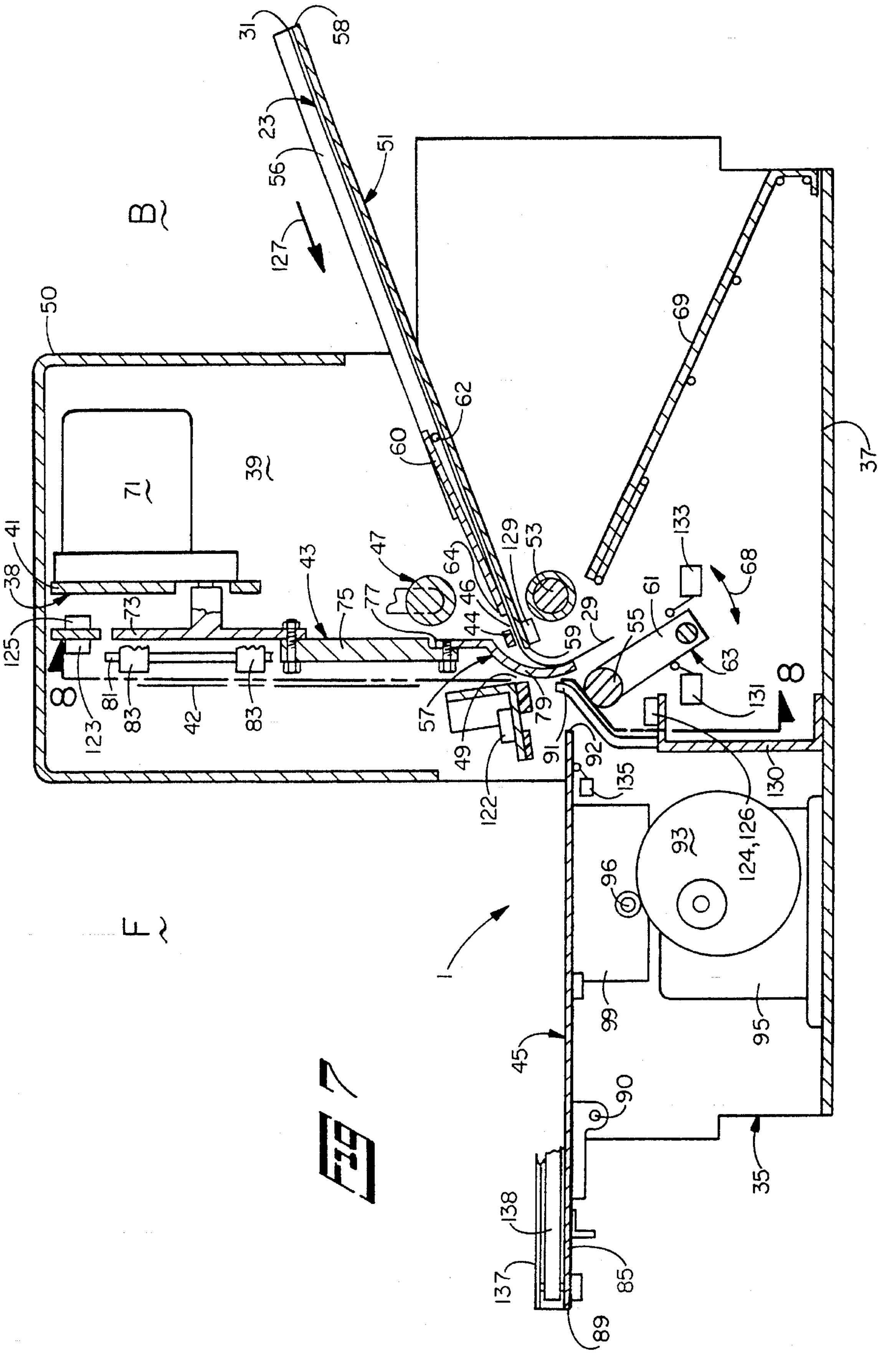
FIG. 7 is a partial longitudinal cross sectional view of the label applicator taken generally along line 7—7 of FIG. 8 showing the label feed mechanism in a first mode for receiving a label sheet.
Figure 8:
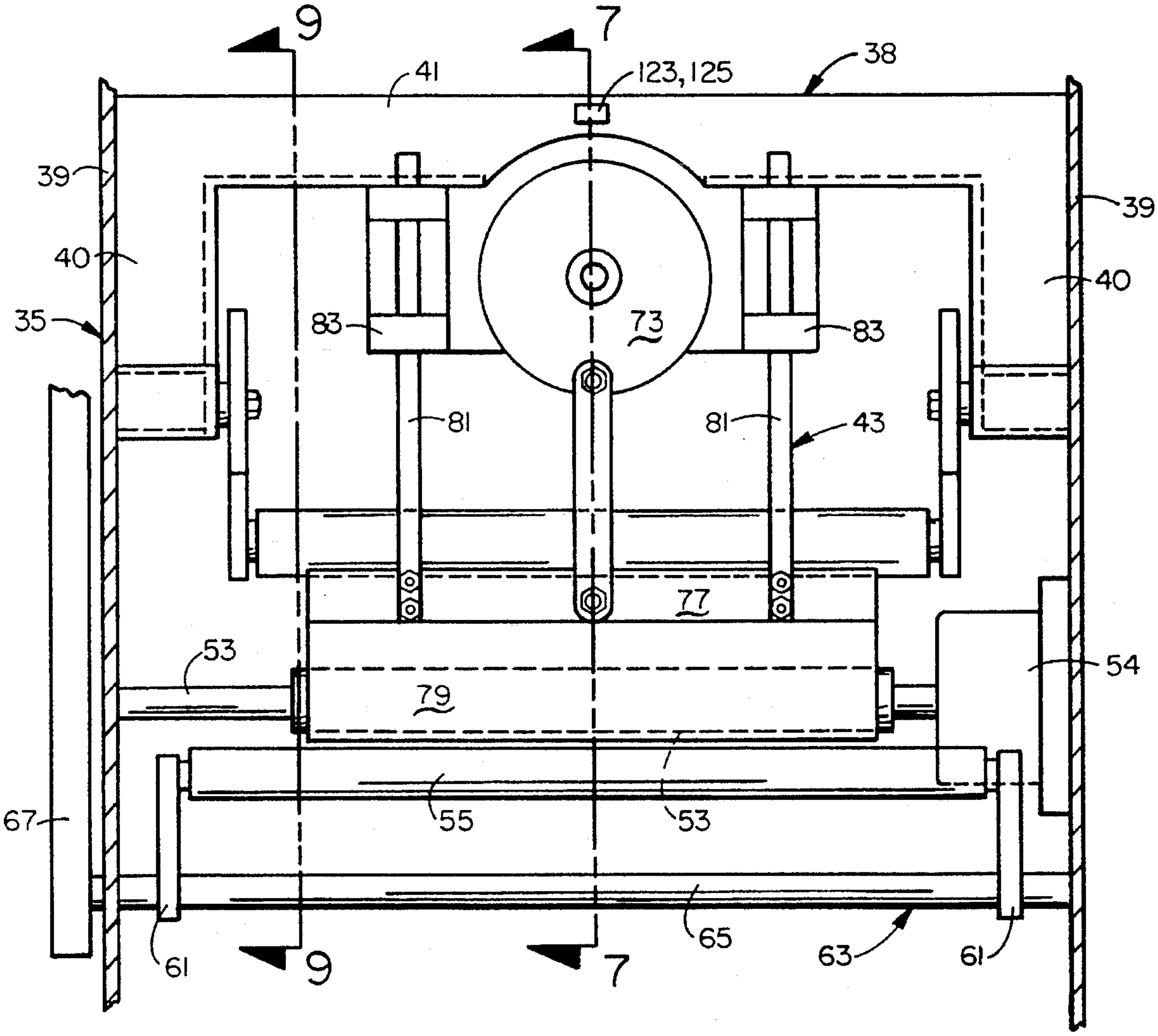

FIG. 8 is a partial view taken along line 8—8 of FIG. 7.

Figure 9:
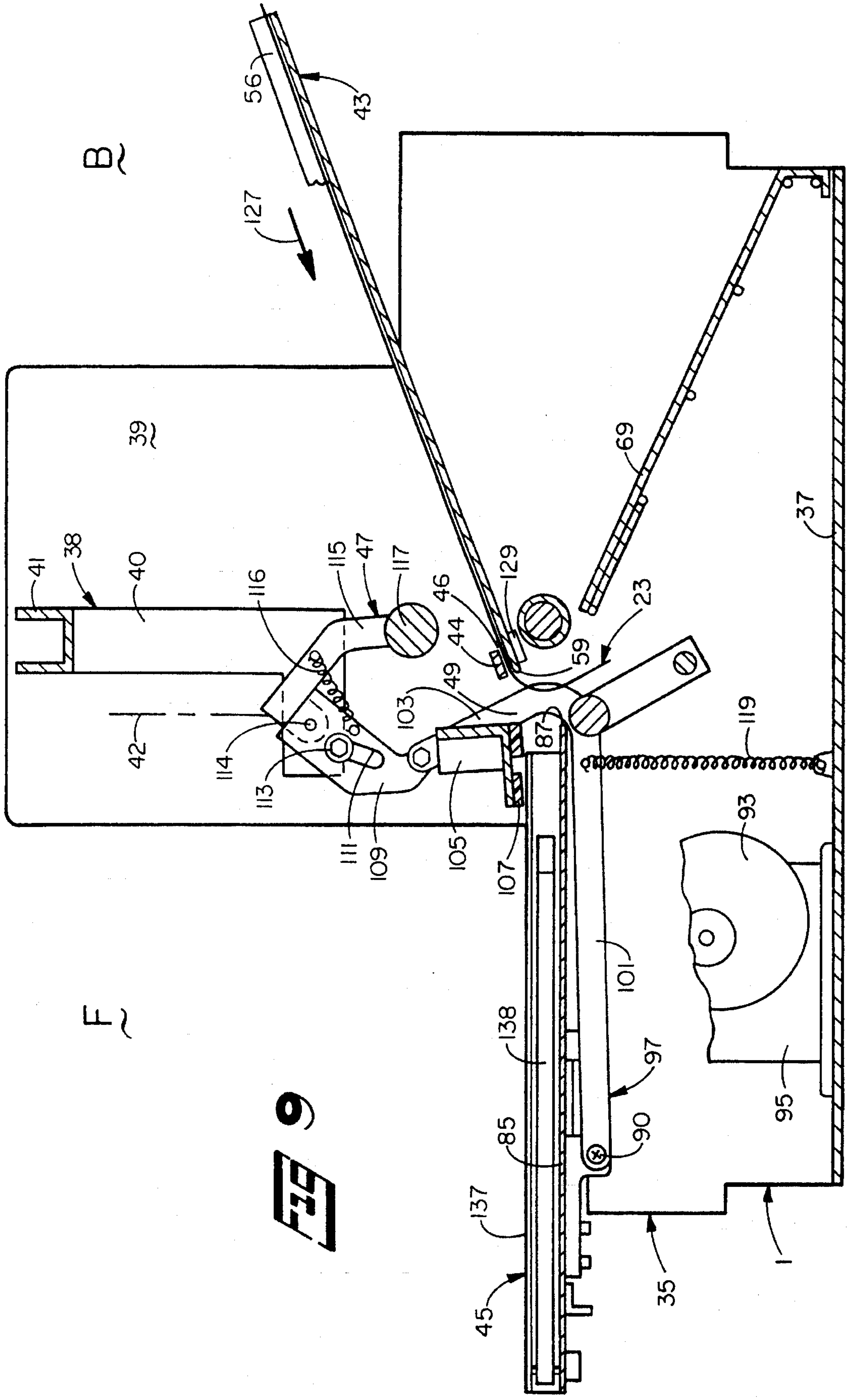

FIG. 9 is a view taken along line 9—9 of FIG. 8 showing the wrapping mechanism in a normal condition.

Figure 10:
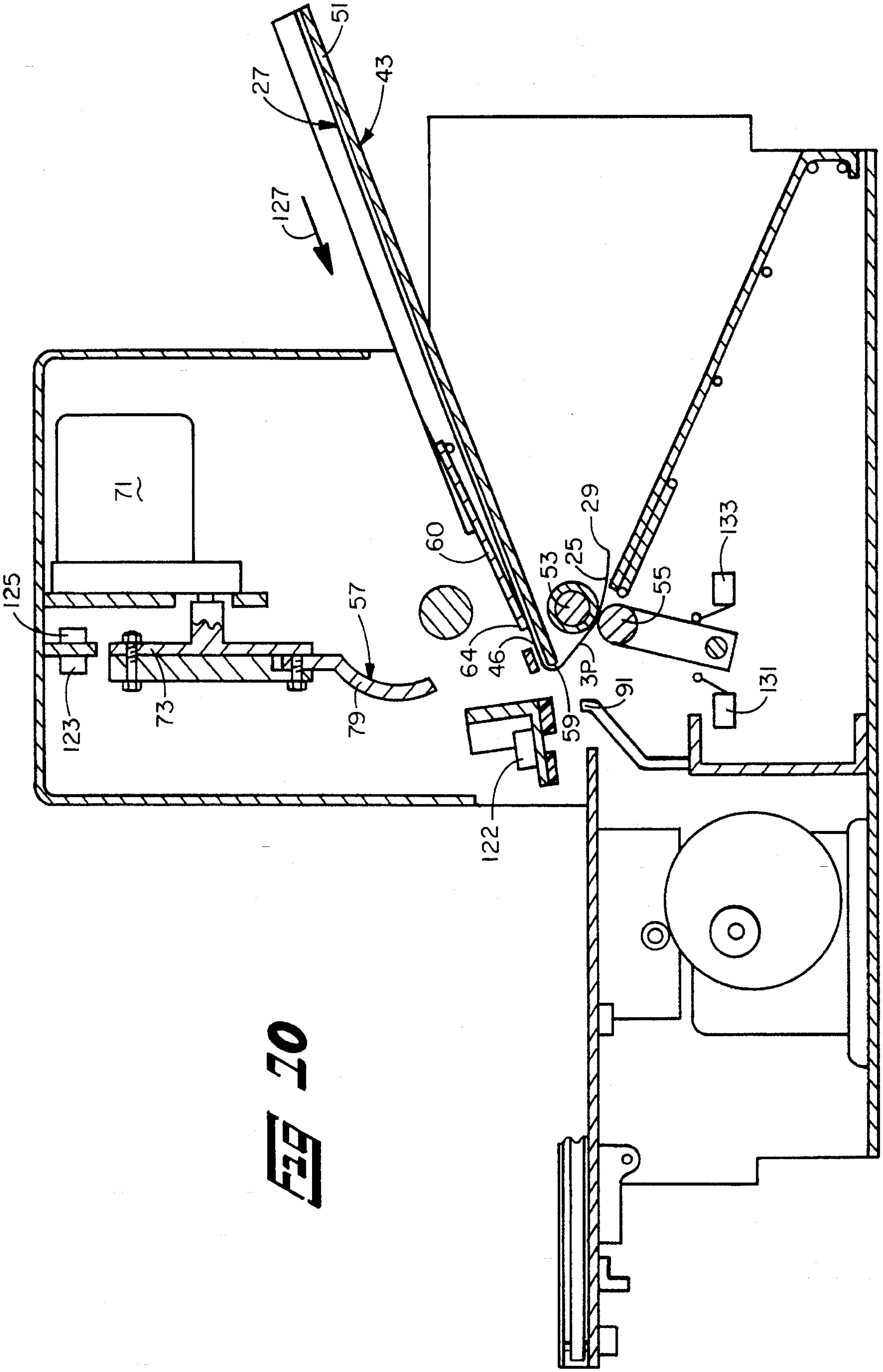

FIG. 10 is a view similar to FIG. 7, but showing the label feed mechanism in a second mode ready to advance the label sheet.

Figure 11:
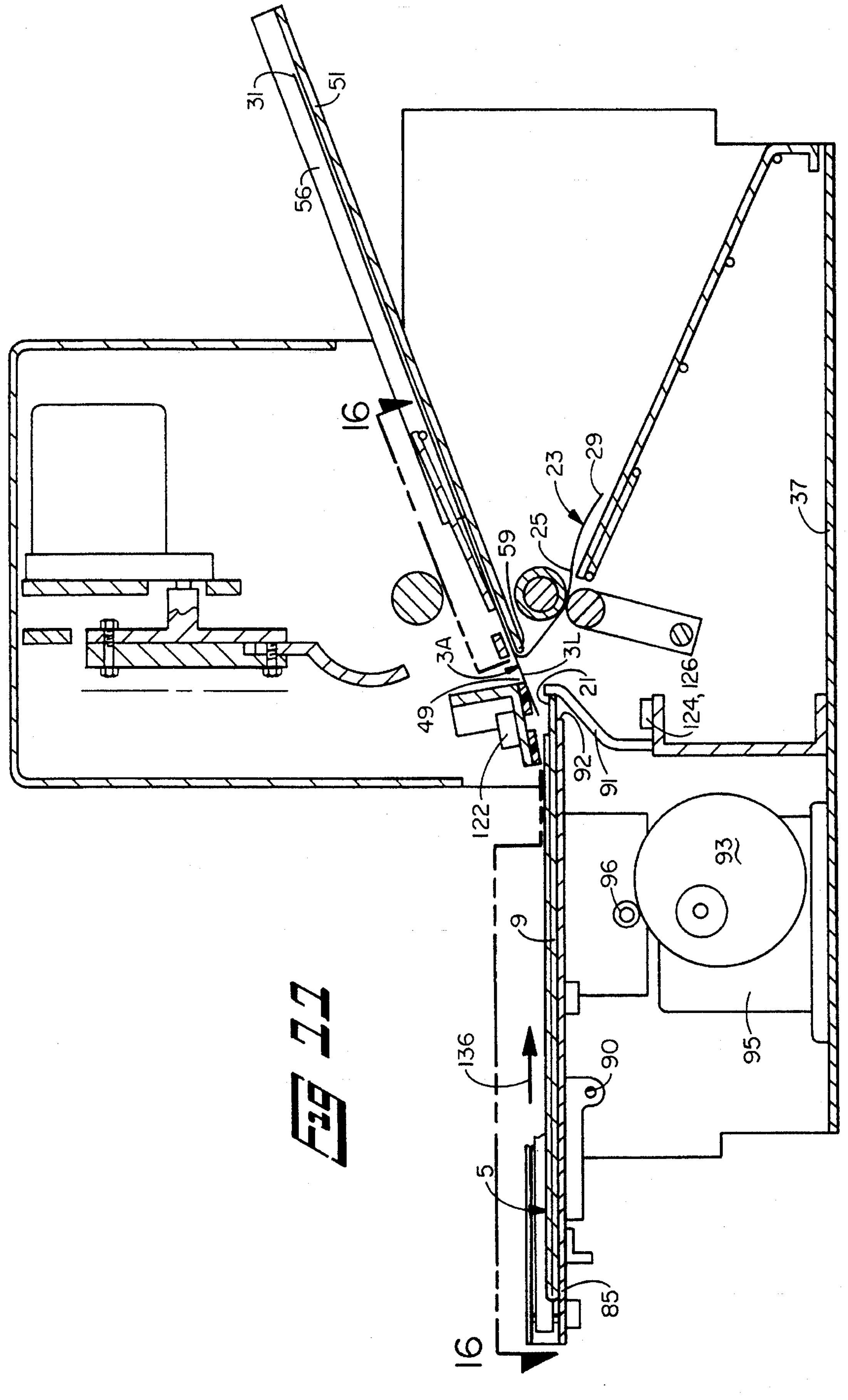

FIG. 11 is a view similar to FIG. 10, but showing the label sheet at an advanced location to present a label to the transfer point.

Figure 12:
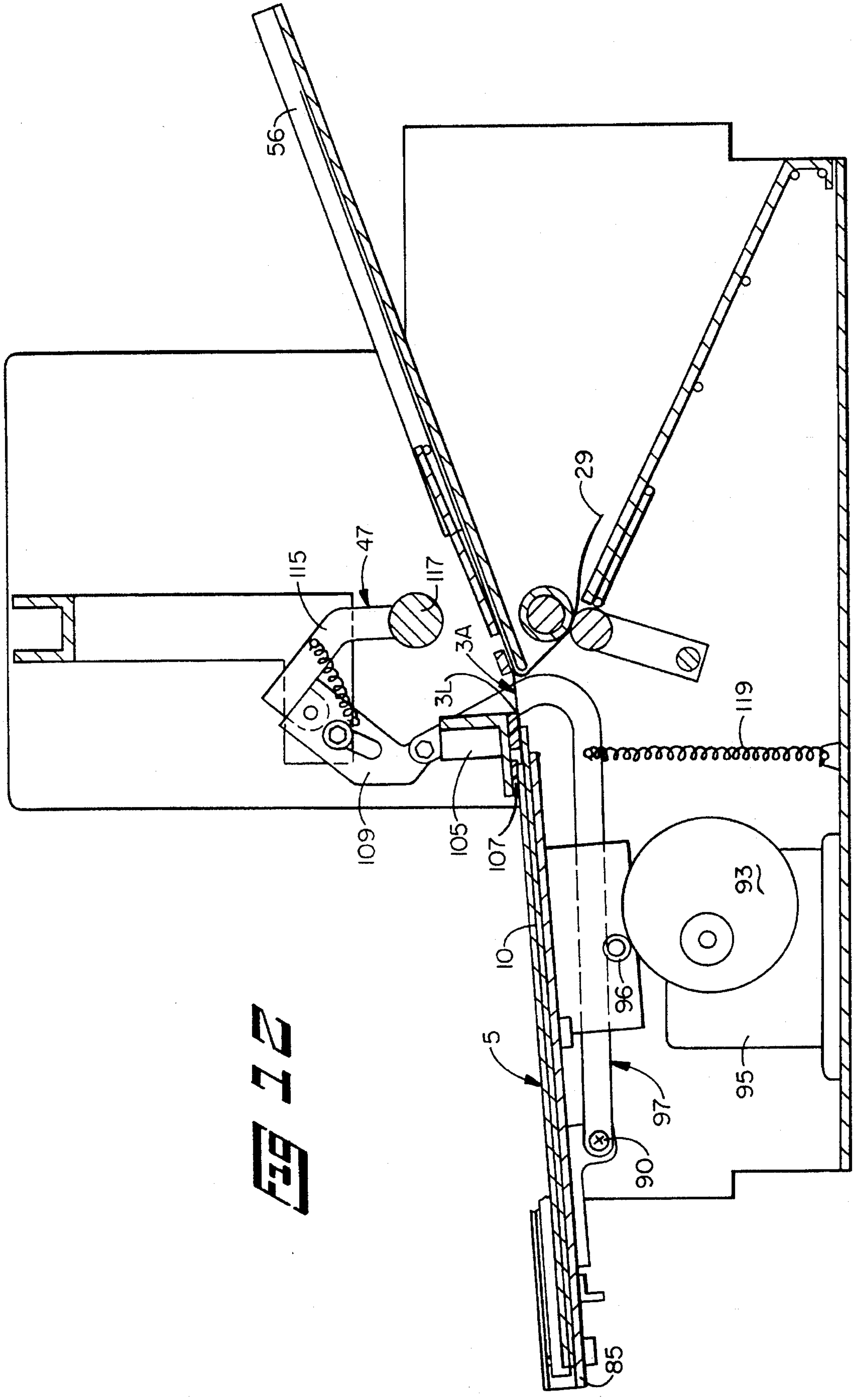

FIG. 12 is a view similar to FIG. 9, but showing the stock table tilted to raise the file folder to the transfer point.

Figure 13:
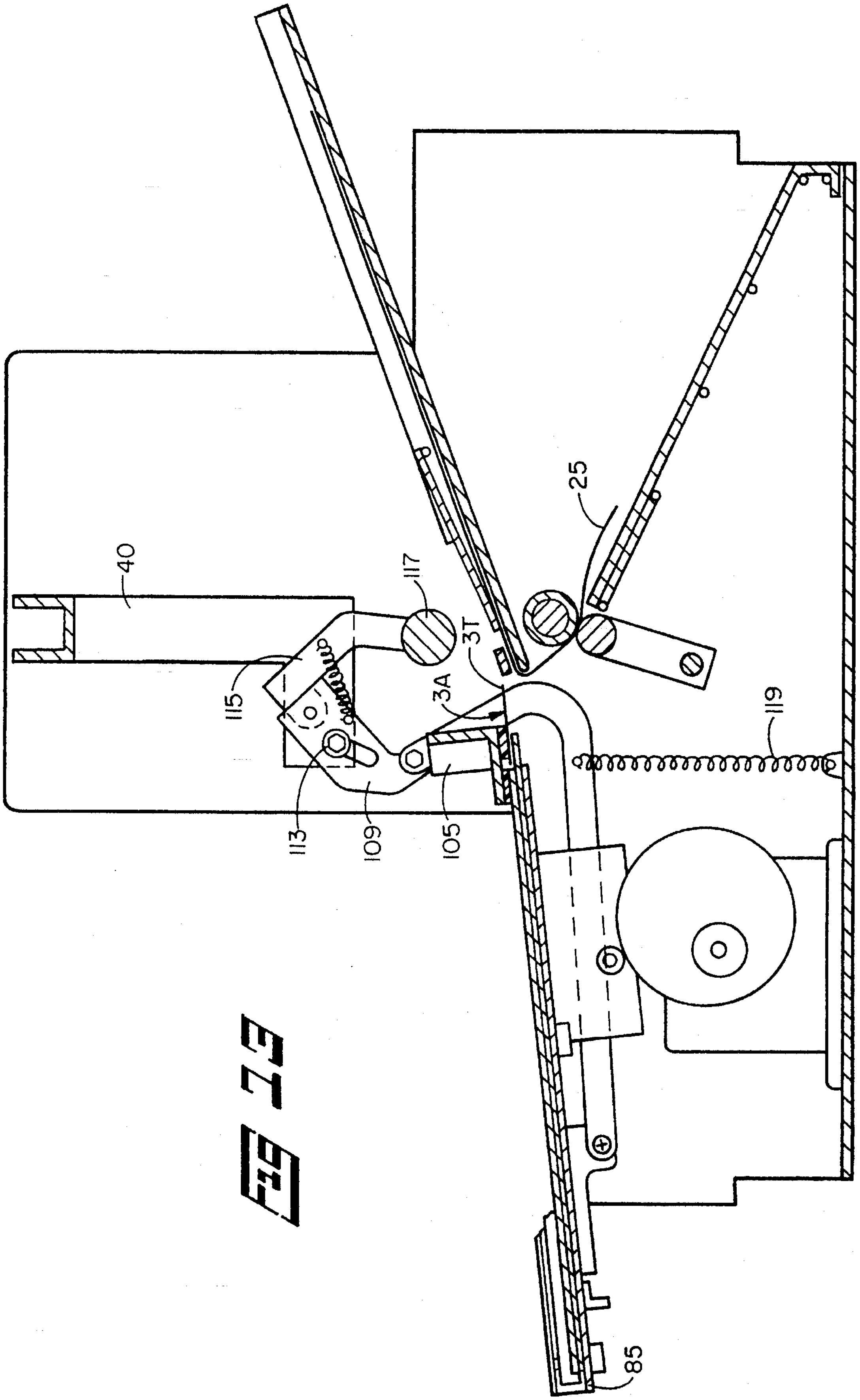

FIG. 13 is a view similar to FIG. 12, but showing the wrapping mechanism at a first intermediate condition.

Figure 14:
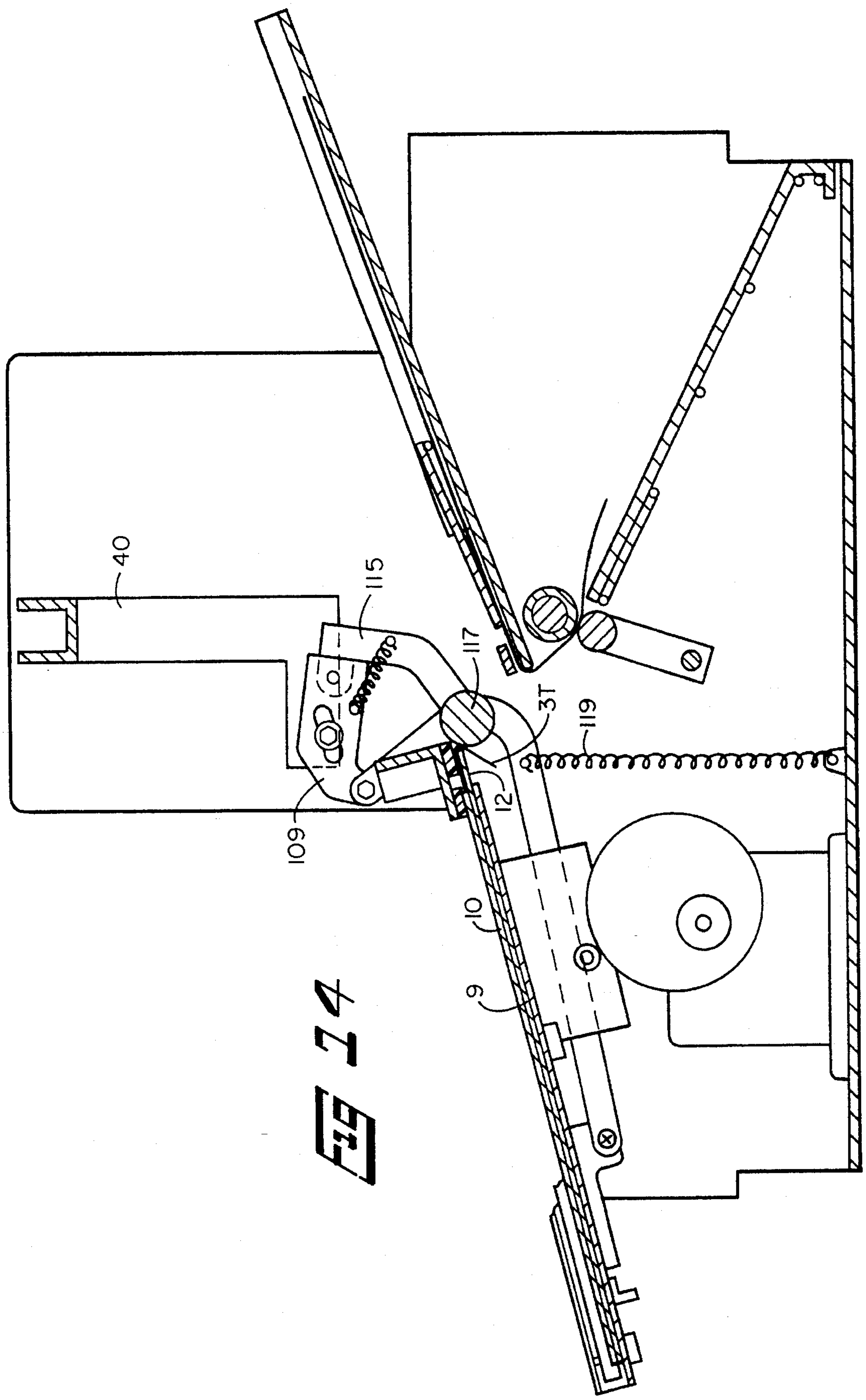

FIG. 14 is similar to FIG. 13, but showing the wrapping mechanism at a second intermediate condition.

Figure 15:
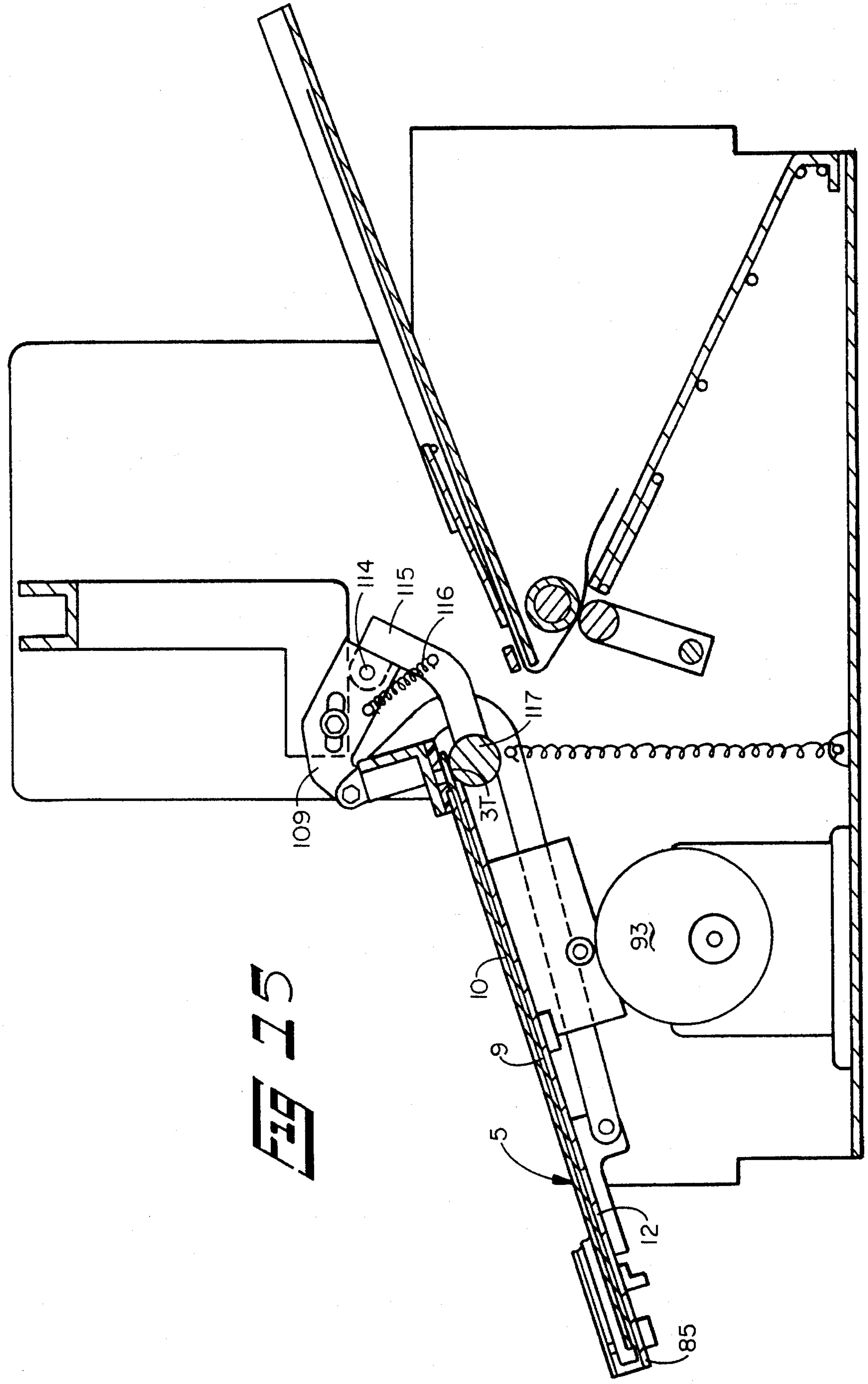
Figure 9:
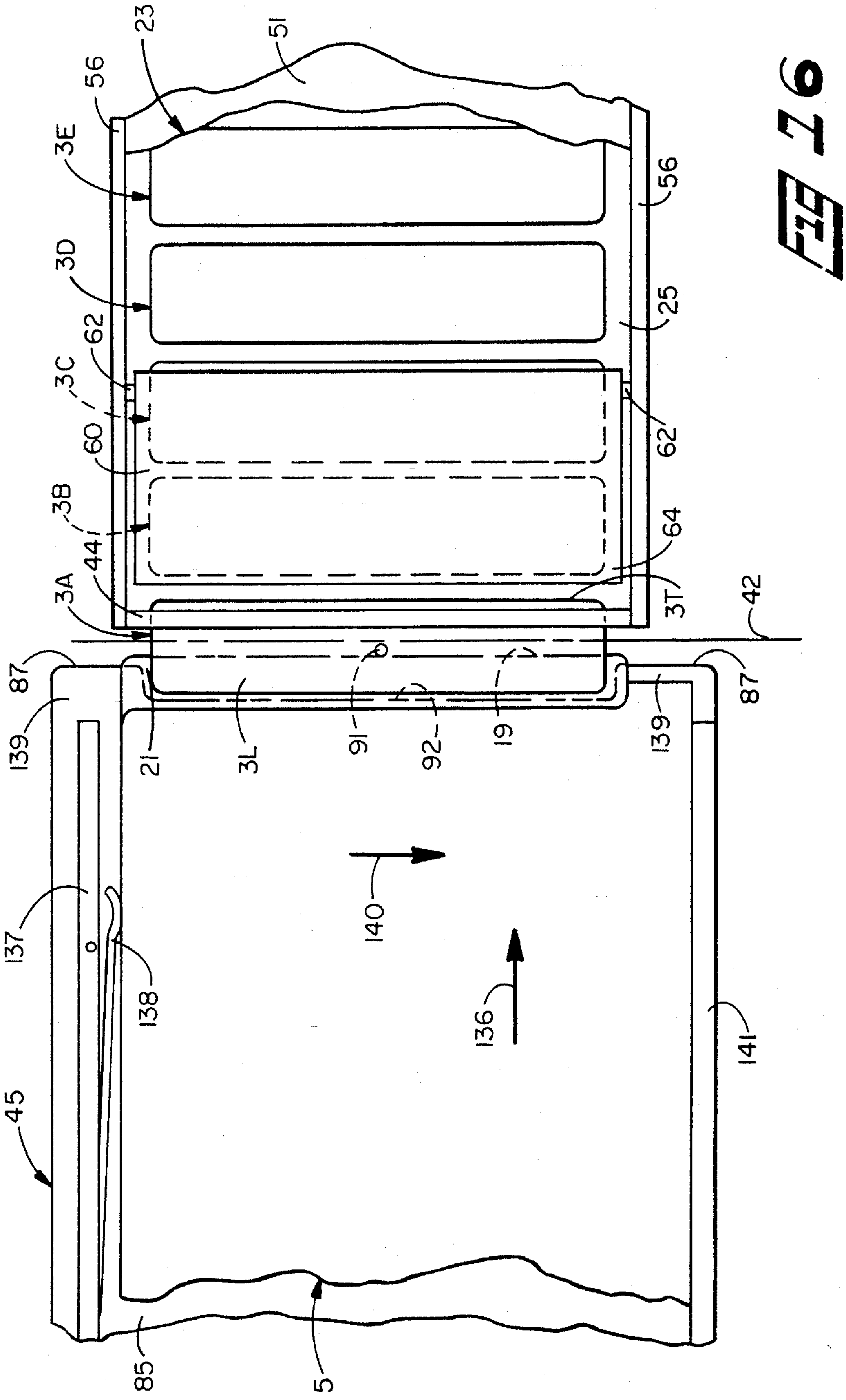

FIG. 15 is a view similar to FIG. 14, but showing the wrapping mechanism at an operating condition.

FIG. 16 is a partial view taken along line 16—16 of FIG. 11.

Figure 17:
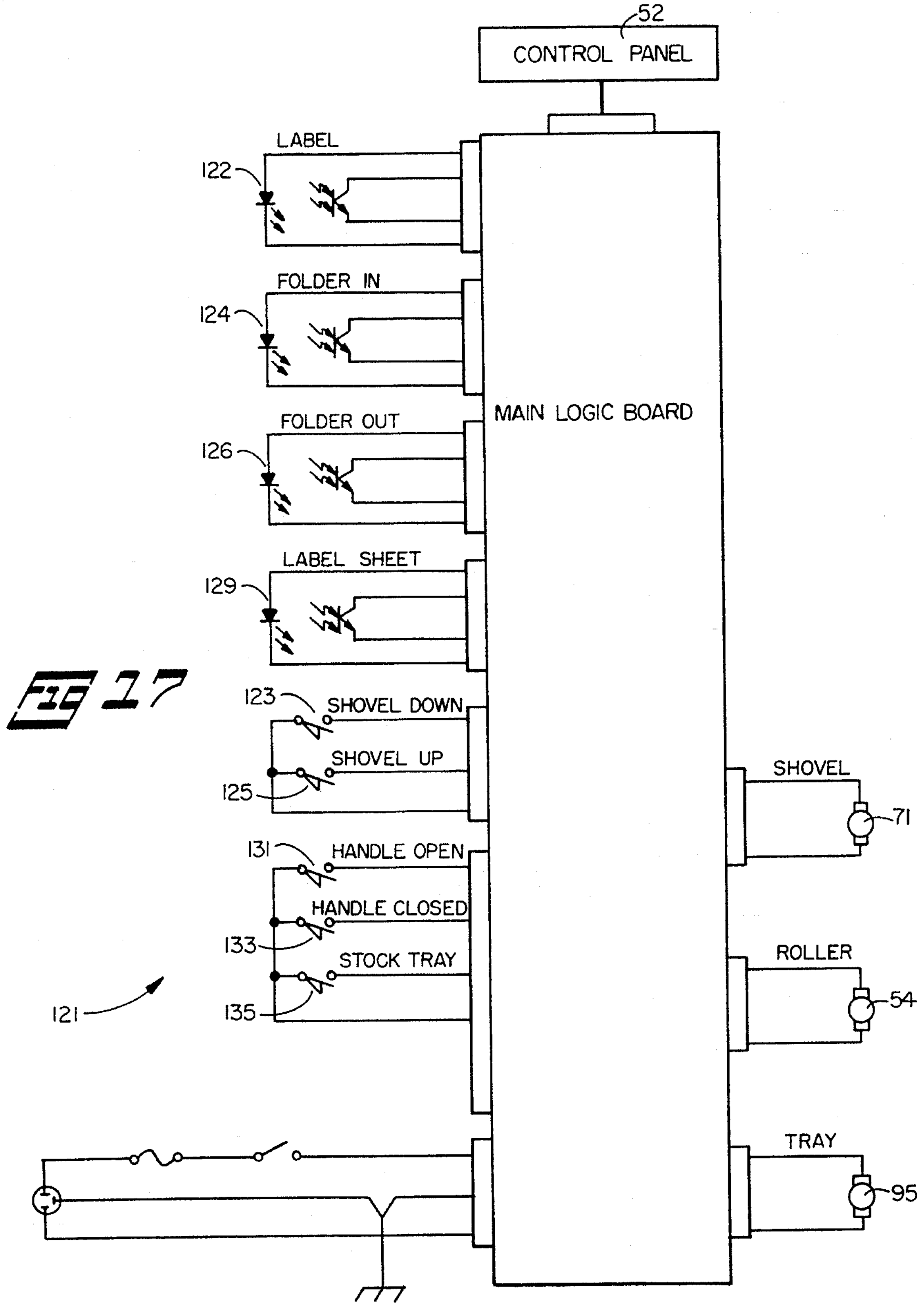

FIG. 17 is a simplified schematic view of the control for the label applicator of the present invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Figure 1:
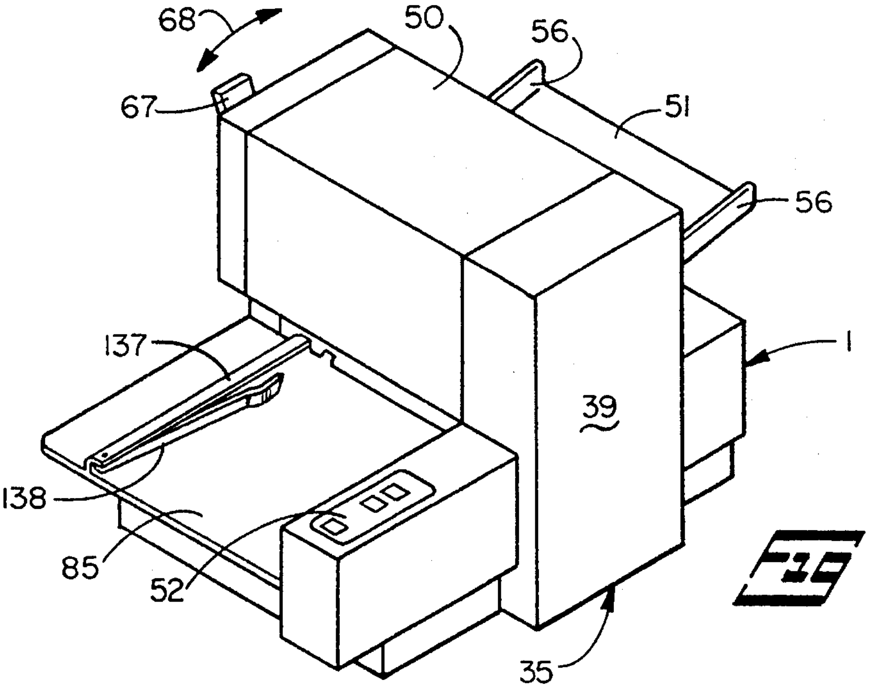
FIG. 1 is a perspective front view of the label applicator of the present invention.
Figure 2:
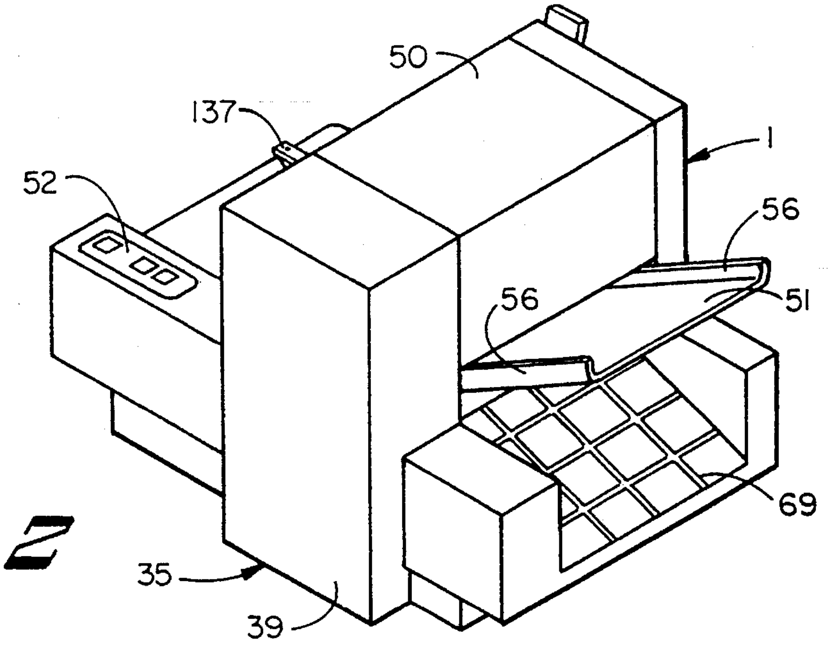
FIG. 2 is a perspective back view of the label applicator.
Figure 6:
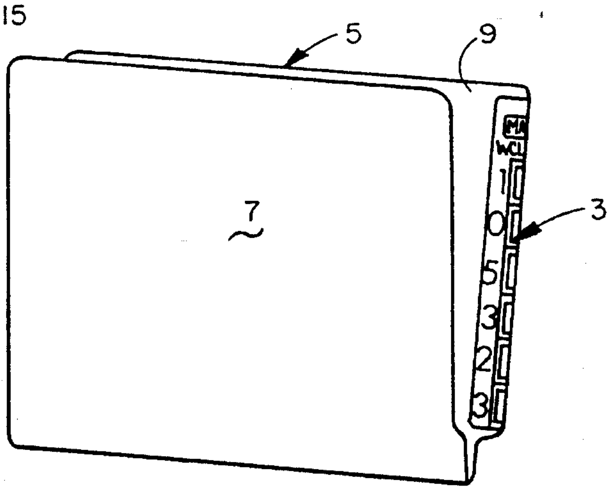
FIG. 6 is a perspective view of the file folder of FIG. 5 showing a label applied thereto.

Referring to FIGS. 1, 2, and 6, a label applicator 1 is illustrated that includes the present invention. The label applicator 1 is particularly useful for applying labels 3 to file folders 5, but it will be understood that the invention is not limited to document storage and retrieval applications.

Figure 5:
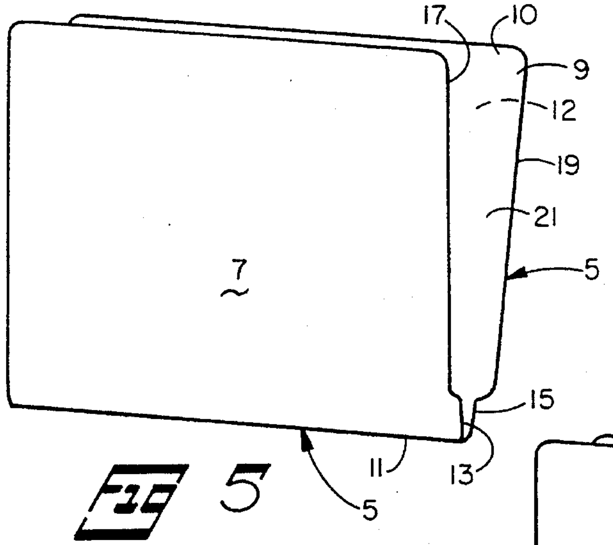
FIG. 5 is a perspective view of a typical file folder to which labels are applied in accordance with the present invention.

Looking also at FIG. 5, the particular file folder 5 shown is merely representative of a wide variety of pieces of stock to which the labels 3 can be applied. By way of background, the file folder 5 has two flaps 7 and 9 that are joined along a fold line 11. The flap 9 has an inside surface 10 and an outside surface 12. Adjacent the fold line 11, the flaps 7 and 9 have respective straight side edges 13 and 15 that are contiguous when the file folder is folded closed. The remainder of the side edge 17 of the flap 7 is cut back from the straight edge 13. The remainder of the side edge 19 of the flap 9 projects beyond the associated straight edge 15. Consequently, an area 21 of the flap 9 is exposed when the file folder is closed. It is to the area 21, on both surfaces 10 and 12, of the flap 9 that the label 3 is applied by the label applicator 1.

Label Sheet

Figure 3:
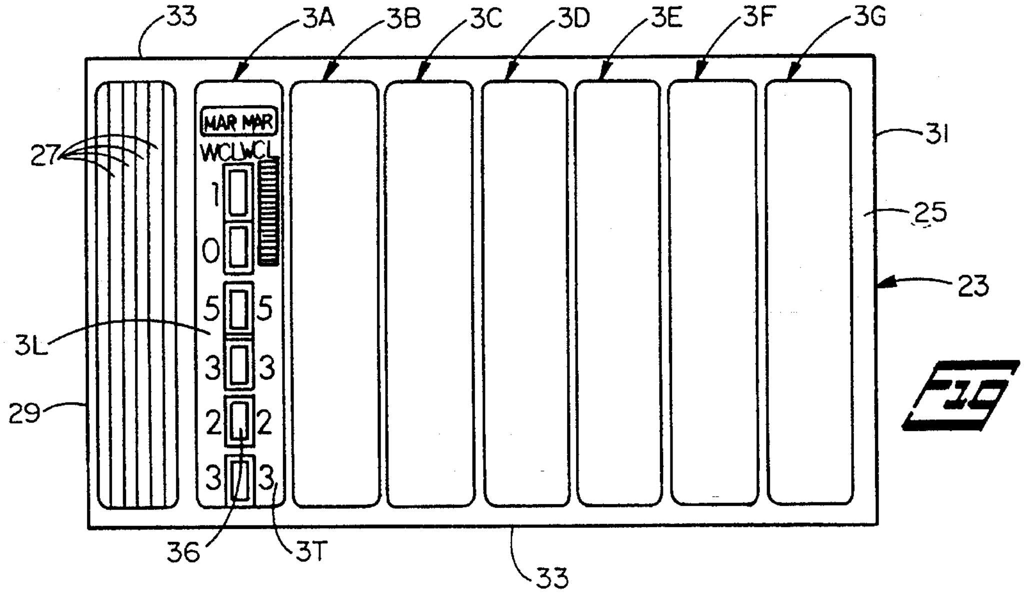
FIG. 3 is a top view of a label sheet according to the present invention.
Figure 4:
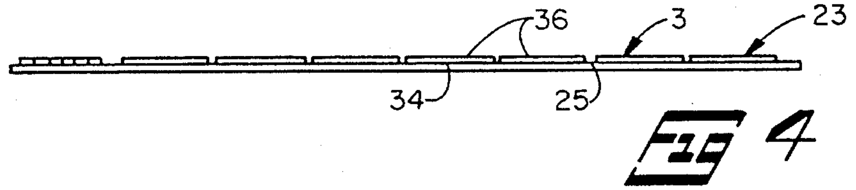
FIG. 4 is a front view of the label sheet of FIG. 3.

In accordance with the present invention, the labels 3 form part of a label sheet 23, FIGS. 3 and 4, that is processed by the label applicator 1 to apply the labels to the file folders 5. The label sheet 23 is comprised of a flexible but sturdy backing sheet 25, one or more turning strips 27, and one or more labels 3A–3G. The backing sheet 25 has a leading edge 29 and a trailing edge 31. The turning strips 27 are made as long narrow strips from a relatively stiff material. They preferably extend most of the way between the two side edges 33 of the backing sheet and are parallel to the backing sheet leading edge 29. The turning strips may be affixed to the backing sheet with a pressure sensitive adhesive.

The labels 3A–3G are affixed to the backing sheet 25 at regular intervals between the turning strips 27 and the backing sheet trailing edge 31. The labels are rather weakly affixed to the backing sheet by respective thin layers 34 of a pressure sensitive adhesive. The labels may be relatively long and arranged in single file, as shown. Alternately, two or more rows of separate labels may be affixed in parallel columns between the turning strips and the backing sheet trailing edge. The labels may be imprinted with any desired indicia 36 that is required for the filing purpose at hand. The label material is preferably relatively stiff compared with the stiffness of the backing sheet. Each label has a leading portion 3L facing toward the turning strips and a trailing portion 3T facing away from the turning strips.

Label Applicator

Returning to FIGS. 1 and 2, and also looking at FIGS. 7–9, the label applicator 1 comprises a frame 35 that in turn includes a floor plate 37 and two upstanding side walls 39. The frame 35 defines a central plane 42. The central plane 42 forms a dividing line that separates the label applicator into front and back sides F and B, respectively. In the illustrated construction, the central plane is vertical. However, the central plane need not be vertical; in some instances it may be preferable that the central plane slope downwardly toward the label applicator back side B. Fastened to the side walls 39 of the frame 35 is a generally C-shaped beam 38, having two L-shaped side beams 40 and a top beam 41. The plane of the C-shaped beam 38 is generally parallel to the central plane.

A label feed mechanism 43 is located at the back side B of the label applicator 1, a stock feed mechanism 45 is located at the front side F, and a wrapping mechanism 47 generally straddles the central plane 42. The label feed mechanism 43 feeds labels 3 of the label sheet 23 (FIGS. 3 and 4) to a transfer point 49 that is located generally in the central plane. The stock feed mechanism 45 presents the area 21 of a file folder 5 (FIGS. 5 and 6) to the label at the transfer point 49. The stock feed mechanism presses the file folder area 21 on the inside surface 10 of the flap 9 against the adhesive 34 of the leading portion 3L of a label and thereby causes that portion of the label to adhere to the file folder. The wrapping mechanism 47 then acts in conjunction with the stock feed mechanism to wrap the trailing portion 3T of the label around the flap side edge 19 and press the label trailing portion to the flap outside surface 12. A cover 50 interfits with the side walls 39 of the frame 35 to conceal the label feed and wrapping mechanisms.

The label applicator 1 further includes an electrical control circuit schematically represented at reference numeral 121 in FIG. 17. A control panel 52 built into the label applicator frame 35 forms a part of the control circuit 121. The control panel 52 provides a user with various information regarding the operation of the label applicator.

Label Feed Mechanism

Looking especially at FIGS. 7, 8, and 10, the label feed mechanism 43 includes a label tray 51, a first roller 53, a second roller 55, and a shovel 57. The label tray 51 has a back end 58 and a working edge 59. The label tray working edge 59 is located slightly to the back side B of the central plane 42. The plane of the label tray is preferably approximately 70 degrees to the central plane. Guides 56 on the label tray assure that the label sheets 23 are properly aligned as they enter the label applicator 1. The label tray is permanently mounted to the label applicator side walls 39. A thin strip 44 extends over the label tray working edge 59. The strip 44 and the label tray cooperate to form a slit 46 above the label tray working edge. The height of the slit 46 is carefully controlled to be just slightly greater than the combined thickness of the backing sheet 25 and the labels 3 of the label sheet 23. A drag plate 60 is pivotally mounted, as by pins 62, between the label tray guides 56. The free end 64 of the drag plate 60 is located a short distance from the strip 44.

The first roller 53 is preferably rubber covered. It extends between to the frame side walls 39 for rotation about a fixed longitudinal axis. The first roller is rotatable by a roller motor 54 that is mounted to one of the frame side walls.

The second roller 55 is preferably knurled. The second roller is mounted for rotation between two side legs 61 of a fork 63. The middle leg 65 of the fork 63 is pivotally mounted in the frame side walls 39. One end of the fork middle leg 65 protrudes through a frame side wall and is attached to one end of a handle 67. By pivoting the handle 67 in the directions of arrow 68, the second roller 55 can be brought into or out of rolling contact with the first roller 53. Specifically, the handle can be pivoted to an open position toward the front side F of the label applicator 1. With the handle in its open position, the rollers 53 and 55 are out of contact with each other. When the handle is pivoted to a closed position toward the label applicator back side B, the rollers are in contact with each other. A discharge tray 69 slopes downwardly from the nip of the rollers toward the back side of the label applicator.

The shovel 57 of the label feed mechanism 43 reciprocates generally along the central plane 42. For that purpose, a shovel motor 71 is mounted to the top beam 41 of the C-shaped beam 38. A disk 73 is connected to the shaft of the shovel motor 71. A link 75 pivotally connects the disk 73 to the shovel.

The shovel 57 is fabricated with a flat upper section 77 and a curved lower section 79. The concave side of the shovel curved section 79 faces the working edge 59 of the label tray 51. To guide the shovel for reciprocation, the lower ends of a pair of rods 81 are attached to the shovel flat section 77. The two rods 81 are guided within respective linear bearings 83 secured to the top beam 41. Accordingly, rotation of the shovel motor 71 rotates the disk 73 and causes reciprocation of the shovel. The shovel is reciprocable between a down location whereat its concave surface is adjacent the label tray working edge and an up location whereat the concave surface is above the label tray working edge.

Stock Feed Mechanism

Looking also at FIG. 16, the stock feed mechanism 45 will be described. The stock feed mechanism comprises a flat stock tray 85 that has a first edge 87 and a second edge 89. In the preferred embodiment, the stock tray first edge 87 is slightly to the front side F of the central plane 42 and has a cutout 92 that is slightly longer than the length of the labels 3 on the label sheet 23 (FIGS. 3 and 4). The stock tray 85 is hinged at reference numeral 90 to the side walls 39 of the label applicator frame 35 between the edges 87 and 89.

To tilt the stock tray 85 about its hinges 90, a cam 93 is connected to the shaft of a cam motor 95. The cam motor 95 is mounted to the floor 37 of the label applicator frame 35. The cam 93 is in contact with a roller 96 in a plate 99 on the underside of the stock tray. By operating the cam motor 95, the cam rotates to oscillate the stock tray about its hinges between lowered and raised positions. When the stock tray is in its lowered position, it lies in a generally horizontal plane. When the stock tray is in its raised position, it slopes upwardly toward the central plane 42. Accordingly, the first edge 87 also raises and lowers in response to operation of the cam motor.

A stand 130 is secured to the floor 37 of the frame 35. A stop 91 is joined to the stand 130 and is located approximately in line with the first edge 87 of the stock tray 85. The stop 91 terminates slightly above the plane of the stock tray when the stock tray is in its lowered position.

Wrapping Mechanism

Looking especially FIG. 9, the wrapping mechanism 47 is comprised of a pair of generally J-shaped arms 97. Each arm 97 has a long leg 101 that underlies the stock tray 85 of the stock feed mechanism 45 and a short leg 103 that curves upwardly around the stock tray first end 87. The free end of the long leg 101 of each arm 97 is pivotally connected to the hinge 90 that also pivotally connects the stock tray 85 to the frame 35 of the label applicator 1. The short legs 103 of the arms 97 are rigidly joined to a plate 105 that extends between them and that overlies the stock tray first edge 87. One or more pads 107 of rubber or similar material is bonded to the underside of the plate 105.

Pivotally connected to the free end of the short leg 103 of each arm 97 is one end of a bar 109. Each bar 109 is formed with a slot 111. A cap screw or similar fastener 113 passes through the slot 111 of each bar 109 and is retained in the associated side beam 40 of the C-shaped beam 38. The screws 113 retain the bars to the associated side beams but enable the bars to slide over the pins.

The second end of each bar 109 is pivotally connected by a pin 114 to one end of a lever 115. A spring 116 biases the lever 115 against a stop, not shown, on the bar to maintain the lever and bar at a relative orientation as shown. A wrapping roller 117 extends between the free ends of the levers 115.

Strong springs 119 are connected between the arms 97 of the wrapping mechanism 47 and the floor 37 of the label applicator frame 35. The springs 119 bias the wrapping mechanism to a normal condition as shown in FIG. 9. That is, the long legs 101 of the arms are generally horizontal under the stock tray 85, the bars 109 are at a lower position such that the screws 113 are at the upper ends of their respective slots 111, and the plate 105 and the wrapping roller 117 are on opposite sides of the central plane 42.

Control

To operate the mechanisms described above, the label applicator 1 includes a number of control elements that comprise the control circuit 121, FIG. 17. In the particular control circuit 121 shown, there is a label sensor 122, a folder in sensor 124, a folder out sensor 126, and a label sheet sensor 129. Although any suitable sensors can be used for the foregoing sensors 122, 124, 126, and 129, we prefer to use photoelectric eyes.

The label sensor 122 is preferably mounted on the plate 105 of the wrapping mechanism 47, FIG. 7. The label sensor projects its beam through an opening, not shown, in the plate to a selected point between the pin 91 and the cutout 92 of the stock tray 85. The folder in sensor 124 and folder out sensor 126 may be mounted to the stand 130 to which the stop 91 is joined. The folder in and folder out sensors project their beams to the cutout 92 in the first edge 87 of the stock tray 85. The label sheet sensor 129 is located at the label tray working edge 59 of the label tray 51 and projects its beam through an opening, not shown, in the label tray.

The control circuit 121 also comprises several limit switches. There is a shovel down limit switch 123, a shovel up limit switch 125, a handle open limit switch 131, a handle closed limit switch 133, and a stock tray limit switch 135. The shovel down and shovel up limit switches 123 and 125, respectively, may be mounted to the top beam 41 of the C-shaped beam 38. The shovel down and shovel up limit switches are activated by appropriate means on the disk 73. The handle open and handle closed limit switches 131 and 133, respectively, may be placed within the label applicator frame 35 for being actuated by the fork 63. The stock tray down limit switch 135 can also be located within the frame to be actuated by the stock tray 85. Further description of the limit switches and of their functions, as well as of the sensors 122, 124, 126, and 129, will be given shortly.

Operation

The operation of the label applicator 1 to apply labels 3A–3G to file folders 5 include several steps that are performed in sequence. At the start of an operation, the cam 93 of the stock feed mechanism 45 is at a rotational position such that the stock tray 85 is at an approximately horizontal lowered position. The stock tray limit switch 135 is closed to enable further operations to take place. The wrapping mechanism 47 is in its normal condition.

The first step is to load a label sheet 23 into the label applicator 1. For that purpose, the handle 67 is pivoted toward the front side F of the label applicator to the handle open position of FIGS. 7 and 9. Upon reaching the handle open position, the fork 63 trips the handle open limit switch 131, thereby verifying that the handle is indeed in its open position. The limit switch 131 activates a relay, not shown but well known in the art, to operate the shovel motor 71. The shovel motor rotates the disk 73 to translate the shovel 57 to its down location of FIGS. 7 and 8. The shovel down limit switch 123 verifies that the shovel is in its correct down location.

A label sheet 23 is placed on the label tray 51 of the label feed mechanism 43 with the labels 3A–3G facing upwardly. For clarity, a slight gap is shown between the label sheet and the label tray, but in reality the label sheet backing sheet 25 is in facing contact with the label tray. The leading edge 29 of the backing sheet 25 is manually pushed in the direction of arrow 127 through the slit 46 between the strip 44 and the label tray working edge 59. The free end 64 of the drag plate 60 bears on the label sheet to prevent unintentional movement of the label sheet. The presence of the backing sheet leading edge at the label tray working edge is sensed by the label sheet sensor 129. The label sheet sensor 129 will activate an audio signal if a label sheet is pushed to the label tray working edge while the handle 67 is in its closed position. The label sheet is pushed further in the direction of arrow 127 against the curved section 79 of the shovel 57, thereby causing the backing sheet leading edge to bend downwardly under the label tray working edge. The label sheet turning strips 27 provide stiffness to the backing sheet and thereby enable it to be bent downwardly in a smooth curve without wrinkling. The label sheet is pushed until the backing sheet leading edge is below the lowermost point of the first roller 53. To aid in the proper initial placement of the label sheet on the label tray, the backing sheet can be made with a length such that its trailing edge 31 is approximately aligned with the label tray back end 58 when the label sheet is properly placed.

With the label sheet 23 at its proper initial placement, the handle 67 of the label feed mechanism 43 is pivoted to its closed position, FIG. 10, thereby actuating the handle closed limit switch 133. That action causes four events to occur. First, the second roller 55 comes into contact with the first roller 53. Second, the label sheet turning strips 27 are caught in the nip between the rollers. Third, the shovel motor 71 operates to rotate the disk 73 and translate the shovel 57 to its up location. The shovel up limit switch 125 verifies that the shovel is in its proper up location. Fourth, the roller motor 54 indexes to rotate the rollers 53 and 55 and thereby pull the label sheet 23 in the direction of arrow 127 over the working edge 59 of the label tray 51. The drag plate 60 provides a uniform resistance by dead weight to advancement of the label sheet.

As the leading portion 3L of the label 3A passes over the working edge 59 of the label tray 51, it peels from the backing sheet 25, and the label leading portion continues to travel generally along the plane of the label tray while the backing sheet bends around the label tray working edge, FIG. 11. The label leading portion remains generally within the plane of the label tray because of the relatively sharp reverse bend made by the backing sheet, by the relatively high stiffness of the label material compared to the stiffness to the backing sheet, and by the relatively weak bond between the label and the backing sheet provided by the adhesive layer 34. In addition, the close tolerance between the label sheet 23 and the slit 46 prevents the label sheet from rising off the label tray at the working edge and also inhibits the label from bending. We have found that an angle of approximately 50 degrees between the plane of the label tray 51 and the plane of the portion 3P of the backing sheet between the label tray working edge and the nip formed by the rollers 53 and 55 works very well. The roller motor 54 continues to pull the label sheet and to peel the label from the backing sheet until the label leading portion interrupts the light beam of the label sensor 122. That event occurs when the label 3A is approximately three-fourths peeled from the backing sheet. At that point, the roller motor stops rotation. The label 3A is then at the transfer point 49.

Now a file folder 5 can be brought to the transfer point 49. For that purpose, the closed file folder is placed on the stock tray 85. Also see FIG. 16. A spring loaded arm 138 hinged to an angle 137 on the stock tray pushes the folder in the direction of arrow 140 against a side guide 141. The file folder is manually pushed in the direction of arrow 136 until the edge 19 of the folder flap 9 abuts the stop 91. The presence of the file folder against the stop is sensed by the folder in sensor 124. If a folder is placed against the stop before a label 3 is at the transfer point, the folder out sensor 126 will activate an audio signal. That signal indicates to the user that she must remove the folder until a label is at the transfer point. When the folder is in proper placement against the stop, the area 21 of the flap 9 is over the stock tray cutout 92 and under the leading portion 3L of the label 3A at the transfer point.

With the file folder 5 in place, the label 3A can be applied to the file folder area 21. That is achieved by operating the cam motor 95 to rotate the cam 93 against the roller 96 on the stock tray 85. Consequently, the stock tray tilts about the hinges 90 to raise the stock tray first edge 87. Tilting the stock tray causes the stock tray limit switch 135 to open and through appropriate control logic prevents any actuation of the shovel motor 71 or the roller motor 54. Cam operation continues until the stock tray is at an intermediate position whereat the file folder area 21 contacts the adhesive layer 34 of the label 3A, FIG. 12. A slight further rotation of the cam 93 raises the stock tray to squeeze the label leading portion between the folder area 21 and the pad 107 of the plate 105 of the wrapping mechanism 47.

Continued operation of the cam 93 by the motor 95 causes further tilting of the stock tray 85 and raising of the stock tray first edge 87. As a result, the region 139 of the stock tray proximate the cutout 92, together with the file folder area 21 and the leading portion 3L of the label 3A, pushes upwardly on the wrapping mechanism plate pads 107. The springs 119 resist any upward movement of the arms 97 and thus of the plate 105. However, continued operation of the cam motor tilts the stock tray toward a raised position and thus forces the plate 105 upwardly. That action peels the trailing portion 3T of the label 3A completely from the backing sheet 25, FIG. 13. The label trailing portion thus becomes unsupported in space. Simultaneously, the arms 109 pivot and slide about the screws 113. The pivoting and sliding arms cause the wrapping roller 117 to travel in a curved path to bear against the trailing portion of the label, FIG. 14. The wrapping roller travels toward the outside surface 12 of the folder flap 9 and wraps the label over the flap edge 19. When the cam has tilted the stock table to its maximum tilt, the wrapping feed mechanism has reached its operating condition, FIG. 15. At that point, the wrapping roller has pressed the label trailing portion 3T firmly against the outside surface 12 of the flap 9. The pivotal connections 114 and springs 116 between the arms 109 and the levers 115 enable the wrapping roller to conform to the locations of the flap outside surface and of the stock tray while pressing the label trailing portion in place.

Continued operation of the cam 93 allows the stock tray 85 to tilt by gravity back toward its horizontal lowered position of FIG. 10. At the same time, the springs 119 return the wrapping mechanism 47 to its normal condition, FIG. 9. When the stock tray is at its horizontal attitude, the stock tray limit switch 135 is again closed and the wrapping mechanism is in its normal condition. The file folder 5 with the label 3A applied thereto can then be removed from the stock tray. When that is done, the folder in sensor 124 senses the absence of a folder. The folder in sensor triggers the roller motor 54 of the label feed mechanism 43 to advance the label sheet 23 and peel the leading portion 3L of the next label 3B from the backing sheet 25. A new file folder 5 can then be placed on the stock tray 85, and the cam motor 95 is operated to affix the label 3B to the folder. The cycle is repeated until all of the labels 3A–3G on the label sheet are used.

To remove the spent label sheet 23, the handle 67 is pivoted to its open position. Doing so actuates the handle open limit switch 131, which in turn actuates the shovel motor 71 to translate the shovel 57 to its down location, FIGS. 7 and 8. The spent label sheet is pulled off the discharge tray 69. A new label sheet is placed on the label tray 51 and pushed against the shovel 57. The handle is pivoted to its closed position. The label applicator 1 is then ready to apply labels from the new label sheet to a new batch of file folders 5. The drag plate 60 and the slit 46 cooperate to ensure repeatability of the label feeding operation despite any variations in label thickness or backing sheet stiffness of different label sheets.

In summary, the results and advantages of labeled file folders can now be more fully realized. The label applicator 1 provides a way to significantly increase the flexibility and reduce the lead time of applying labels 3 to file folders 5 on a custom basis as compared with traditional label application methods and apparatus. This desirable result comes from using the combined functions of the label applicator label feed mechanism 43, stock feed mechanism 45, and wrapping mechanism 47 and of the label sheet 23. The label feed mechanism feeds a portion 3L of a label to the transfer point 49, and the stock feed mechanism presents the file folder to the transfer point for applying the label portion 3L to one surface of a folder flap. The wrapping mechanism wraps a second portion 3T of the label around the flap edge to the opposite flap surface. Various controls associated with the label applicator enable its mechanical components to operate with minimum human effort.

It will also be recognized that in addition to the superior performance of the label applicator 1, its construction renders it of very modest cost relative to its benefits. Moreover, since the various components are both simple and sturdy, the need for maintenance is minimal.

Thus, it is apparent that there has been provided, in accordance with the invention, a label applicator that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A label applicator comprising:

a. frame means for defining a transfer point and a central plane passing generally through the transfer point;

b. label feed means for feeding a first portion of a label to the transfer point;

c. stock feed means for presenting a piece of stock having a first edge and opposed first and second surfaces to the transfer point to apply the first portion of the label to the stock first surface adjacent the stock first edge; and d. wrapping means generally straddling the central plane for applying a second portion of the label to the stock second surface at a location .proximate the transfer point.

2. The label applicator of claim 1 wherein the label feed means comprises:

a. a planar label tray secured to the frame means and having a working edge proximate the central plane, the label tray supporting a label sheet having the label affixed thereto;

b. shovel means for reciprocating generally along the central plane, the shovel means comprising:

i. a shovel having a concave surface;

ii. guide means secured to the frame means for guiding the shovel for reciprocation; and iii. shovel motor means for selectively reciprocating the shovel between a first location whereat the shovel concave surface is proximate the label tray working edge and a second location whereat the shovel is remote from the label tray working edge; and c. roller means for selectively advancing the label sheet along the label tray.

3. The label applicator of claim 2 wherein the roller means comprises:

a. a fixed roller mounted for rotation to the frame means;

b. handle means for pivoting between first and second positions;

c. movable roller means for cooperating with the fixed roller to form a nip therewith with the label sheet being caught in the nip in response to pivoting the handle means to the first position thereof and for separating from the fixed roller in response to pivoting the handle means to the second position thereof; and d. roller motor means for selectively rotating the fixed roller and thereby advancing the label sheet along the label tray when the handle means is in the first position thereof.

4. The label applicator of claim 2 wherein:

a. the roller means cooperates with the label tray working edge to bend the label sheet under the label tray working edge and peel the first portion of the label from the label sheet and to feed the first portion of the label to the transfer point when the roller means advances the label sheet along the label tray; and b. the label feed means further comprises strip means proximate the label tray working edge for cooperating therewith to maintain the first portion of the label generally coplanar with the label tray when the first portion of the label is peeled from the label sheet.

5. The label applicator of claim 2 further comprising drag means for providing a uniform resistance to the advancement of the label sheet along the label tray by the roller means.

6. The label applicator of claim 1 wherein the stock feed mechanism comprises:

a. a stock tray having a first edge proximate the central plane, the stock tray supporting the piece of stock with the second surface thereof being in facing contact with the stock tray, a predetermined area of the piece of stock overhanging the stock tray first edge;

b. hinge means for tilting connecting the stock tray to the frame means; and c. tray motor means for selectively tilting the stock tray from a lowered position whereat the predetermined area of the piece of stock is under the first portion of the label at the transfer point to an intermediate position whereat the label first portion is applied to the first surface of the piece of stock.

7. The label applicator of claim 6 further comprising stop means secured to the frame means for cooperating with the first edge of the piece of the stock to properly place the piece of stock on the stock tray.

8. The label applicator of claim 6 wherein the tray motor means comprises:

a. a cam in contact with the stock tray; and b. cam motor means for selectively operating the cam to tilt the stock tray about the hinge means.

9. The label applicator of claim 6 wherein the wrapping means comprises:

a. a pair of arms having respective first legs hinged to the frame means and respective second legs;

b. a plate rigidly joined to the second legs of the arms, the plate overlying the stock tray first edge;

c. bar means pivotally joined to the second legs of the arms for sliding and pivoting relative to the frame means;

d. a wrapping roller supported by the bar means; and e. biasing means for biasing the wrapping means to a normal condition whereat the bar means is at a first location relative to the frame means and the wrapping roller is on the opposite side of the central plane as the plate.

10. The label applicator of claim 9 wherein the label first portion is squeezed between the selected area of the first surface of the piece of stock and the plate and the second portion of the label is peeled from the label sheet in response to continued tilting of the stock tray by the tray motor means.

11. The label applicator of claim 10 wherein the tray motor means tilts the stock tray to a raised position and thereby forces the wrapping mechanism to an operating condition whereat the bar means pivots and slides relative to the frame and causes the wrapping roller to travel along a path that contacts the second portion of the label and wraps the second portion of the label around the first edge of the piece of stock and applies the second portion of the label to the second surface of the piece of stock.

12. The label applicator of claim 9 wherein the bar means comprises:

a. a pair of bars having respective first and second ends and defining respective slots therethrough, the first ends of the bars being pivotally joined to the second legs of the associated arms;

b. screw means passing through the slots of the bars to pivotally and slidingly hold the bars to the frame means;

c. a pair of levers, each lever having a first end pivotally connected to a respective bar second end and a second end, the wrapping roller being supported between the second ends of the levers; and d. means for yieldingly maintaining a predetermined orientation between the bars and the associated levers.

13. Apparatus for applying a label to first and second opposite surfaces of a selected area of a piece of stock adjacent an edge thereof comprising:

a. a frame having a floor, spaced apart side walls, and a top beam, the frame defining a central plane that extends between the side walls and that divides the frame into front and back sides;

b. label feed means located generally on the frame back side for feeding a label first portion to a transfer point located generally within the central plane;

c. stock feed means located generally on the frame front side for presenting the selected area of the piece of stock to the transfer point to apply the label first portion to the first surface of the piece of stock; and d. wrapping means generally straddling the central plane for applying a label second portion to the selected area of the piece of stock on the second surface thereof.

14. The apparatus of claim 13 wherein the label feed mechanism comprises:

a. a planar label tray joined to the frame side walls and having a working edge proximate the transfer point, the label tray supporting a label sheet having a leading edge and having the label affixed thereto;

b. shovel means for bending the label sheet leading edge under the label tray working edge in response to the label sheet being manually pushed along the label tray toward the central plane; and c. roller means for selectively advancing the label sheet supported on the label tray to peel the label first portion from the label sheet and to feed the label first portion to the transfer point.

15. The apparatus of claim 14 wherein the roller means comprises:

a. a first roller extending between the frame side walls and located generally under the label tray working edge;

b. handle means for pivoting between open and closed positions;

c. a second roller supported by the handle means, the second roller being out of contact with the first roller when the handle means is pivoted to the open position thereof and being in contact with the first roller and cooperating therewith to form a nip with the label sheet leading edge caught in the nip when the handle means is pivoted to the closed position thereof; and d. roller motor means for selectively rotating the first and second rollers to advance the label sheet along the label tray and peel the label first portion therefrom and feed the label first portion to the transfer point.

16. The apparatus of claim 15 wherein the shovel means comprises:

a. a shovel having a concave surface facing the frame back side;

b. guide means for guiding the shovel to reciprocate generally along the central plane; and c. shovel motor means for reciprocating the shovel between a first location whereat the shovel concave surface is proximate the label tray working edge and a second location whereat the shovel concave surface is remote from the label tray working edge, so that the label sheet leading edge is bent under the label tray working edge by the shovel concave surface and can be caught in the nip between the first and second rollers when the label sheet is pushed along the label tray and the shovel is in its first location and the handle means is pivoted to its closed position.

17. The apparatus of claim 14 further comprising drag means for providing a uniform resistance by dead weight to the advancement of the label sheet by the roller means.

18. The apparatus of claim 14 further comprising a strip that cooperates with the label tray working edge to define a slit through which the label sheet is advanced, the slit aiding to maintain the label first portion generally coplanar with the label tray when the label first portion is peeled from the label sheet.

19. The apparatus of claim 13 wherein the stock feed means comprises:

a. tray means for supporting the piece of stock and for tilting about the frame between lowered and raised positions; and b. stop means secured to the frame for cooperating with the edge of the piece of stock to place the selected area thereof generally under the transfer point when the tray means is at its lowered position.

20. The apparatus of claim 19 wherein the tray means comprises:

a. a stock tray hinged to the frame side walls, the stock tray having a first edge located proximate the frame central plane, the second surface of the piece of stock being in facing contact with the stock tray and the selected area of the piece of stock overhanging the stock tray first edge; and b. tray motor means for tilting the stock tray to an intermediate position between the lowered and raised positions thereof whereat the first surface of the selected area of the piece of stock contacts the label first portion at the transfer point to adhere the label first portion to the first surface of the piece of stock.

21. The apparatus of claim 19 wherein the wrapping means comprises:

a. bar means for pivoting and sliding relative to the frame side walls;

b. wrapping roller means supported by the bar means for contacting the label second portion in response to pivoting and sliding of the bar means;

c. arm means pivotable about the frame for pivoting and sliding the bar means; and d. plate means rigidly joined to the arm means for being contacted by the tray means when the tray means is tilted to the raised position thereof to pivot the arm means about the frame and to pivot and slide the bar means relative to the frame and thereby cause the wrapping roller means to contact the label second portion and wrap the label second portion around the edge of the piece of stock and apply the label second portion to the selected area of the piece of stock on the second surface thereof.

22. The apparatus of claim 21 wherein the wrapping means is in a normal condition whereat the plate means extends across the tray means proximate the central plane and the wrapping roller means is proximate the central plane on the back side of the frame when the tray means is in the lowered position thereof.

23. The apparatus of claim 21 wherein the bar means comprises:

a. a pair of bars pivotally and slidingly attached to respective side walls of the frame;

b. a pair of levers each pivotally connected to an associated bar, the wrapping roller means being supported between the levers; and c. means for yieldingly biasing the levers to a predetermined orientation relative to the bars and for enabling the levers and the wrapping roller means to conform to the piece of stock and the tray means when the tray means is at the raised position thereof.

24. The apparatus of claim 20 wherein the wrapping means comprises:

a. a pair of arms pivotally hinged to the frame;

b. bar means pivotally connected to the arms for pivoting and sliding relative to the frame in response to pivoting of the arms;

c. a wrapping roller supported by the bar means;

d. a plate rigidly joined to the arms and generally overlying the stock tray first edge, the plate cooperating with the stock tray to apply the label first portion to the piece of the stock when the stock tray is at the intermediate position thereof; and e. spring means for biasing the wrapping means to a normal condition whereat the wrapping roller is at a location on the back side of the frame central plane and proximate the central plane, the stock tray pivoting the plate and arms against the force of the spring means to pivot and slide the bar means and cause the wrapping roller to travel along a path to a working condition whereat the wrapping roller contacts the label second portion and applies the label second portion to the selected area of the piece of stock on the second surface thereof when the tray motor means tilts the stock tray to its raised position.

25. The apparatus of claim 24 wherein the bar means comprises:

a. a pair of bars each pivotally and slidingly attached to a respective frame side wall;

b. a pair of levers having respective first ends pivotally connected to a respective bar and respective second ends, the lever second ends supporting the wrapping roller therebetween; and c. means for biasing the levers to a selected orientation relative to the bars when the wrapping means is in the normal condition thereof and for enabling the wrapping roller to conform to the location of the stock tray and of the selected area of the piece of stock on the stock tray when the wrapping means is in the working condition thereof.

* * * * *